United States Patent
Lee et al.

(10) Patent No.: US 10,331,840 B2
(45) Date of Patent: Jun. 25, 2019

(54) RESOURCE AWARE METHOD FOR OPTIMIZING WIRES FOR SLEW, SLACK, OR NOISE

(71) Applicant: INTERNATIONAL BUSINESS MACHINES CORPORATION, Armonk, NY (US)

(72) Inventors: Alice H. Lee, Belmont, MA (US); Adam P. Matheny, Beacon, NY (US); Jose Luis Pontes Neves, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/996,402

(22) Filed: Jan. 15, 2016

(65) Prior Publication Data
US 2017/0206286 A1   Jul. 20, 2017

(51) Int. Cl.
*G06F 17/50*   (2006.01)
(52) U.S. Cl.
CPC ...... *G06F 17/5077* (2013.01); *G06F 2217/82* (2013.01); *G06F 2217/84* (2013.01)
(58) Field of Classification Search
CPC ................................................. G06F 17/5077
See application file for complete search history.

(56) References Cited

U.S. PATENT DOCUMENTS

| | | | |
|---|---|---|---|
| 5,905,665 A | * | 5/1999 | Rim .......................... G06F 5/10 708/491 |
| 6,684,373 B1 | | 1/2004 | Bodine et al. |
| 7,013,438 B1 | | 3/2006 | Saldanha et al. |
| 7,398,491 B2 | | 7/2008 | Schaeffer et al. |
| 7,503,111 B2 | | 3/2009 | Haridass et al. |
| 7,603,641 B2 | | 10/2009 | Lin |
| 7,698,677 B2 | | 4/2010 | Zhao et al. |
| 8,782,591 B1 | | 7/2014 | Ku et al. |

(Continued)

FOREIGN PATENT DOCUMENTS

| | | |
|---|---|---|
| WO | 9933177 A1 | 7/1999 |
| WO | 2005122027 A2 | 12/2005 |
| WO | 2007112032 A2 | 10/2007 |

OTHER PUBLICATIONS

Hewitt, Terry, "Automatic VLSI Routing Using 2-Layer Metal", Air Force Institute of Technology, pp. 1-31, Mar. 1985 (Year: 1985).*

(Continued)

*Primary Examiner* — Vuthe Siek
*Assistant Examiner* — Aric Lin
(74) *Attorney, Agent, or Firm* — Cantor Colburn LLP; Steven Meyers (57) ABSTRACT

Methods are disclosed to determine if wiring resources are available in the neighborhood of a physically routed net in all three dimensions. Such a method can select a wire trait based on an amount of usage of each wire segment in the net and the total percentage usage of the net. The method can also re-route a net using new wiring resources after determining that wiring resources are available. The new resources can provide improved RC (delay) characteristics and reduced signal coupling. The method can be applied to a VLSI design with multiple fails.

19 Claims, 5 Drawing Sheets

(56) References Cited

U.S. PATENT DOCUMENTS

| | | | |
|---|---|---|---|
| 2001/0014965 A1* | 8/2001 | Hiraga | G06F 17/5077 716/129 |
| 2002/0078425 A1 | 6/2002 | Mehrotra et al. | |
| 2005/0050496 A1* | 3/2005 | Kovacs | G06F 17/5077 716/113 |
| 2005/0172253 A1* | 8/2005 | Osanai | G06F 17/5072 716/112 |
| 2005/0278679 A1* | 12/2005 | Yaguchi | G06F 17/5077 716/130 |
| 2007/0101303 A1* | 5/2007 | Lien | G06F 17/5077 716/52 |
| 2008/0209376 A1* | 8/2008 | Kazda | G06F 17/5068 716/113 |
| 2008/0244497 A1 | 10/2008 | Zhao et al. | |
| 2009/0019415 A1 | 1/2009 | Lavin et al. | |
| 2011/0055790 A1* | 3/2011 | Gao | G06F 17/5077 716/130 |
| 2012/0110537 A1* | 5/2012 | Vedantam | G06F 17/5077 716/129 |
| 2012/0174052 A1 | 7/2012 | Mathur | |
| 2014/0215427 A1 | 7/2014 | Vujkovic et al. | |
| 2015/0113493 A1* | 4/2015 | Lin | G06F 17/5072 716/120 |
| 2015/0213178 A1* | 7/2015 | Lin | G06F 17/5077 716/123 |

OTHER PUBLICATIONS

Kikuchi et al; "Delay-optimal wiring plan for the microprocessor of high performance computing machines." In Design Automation Conference, 2000. Proceedings of the ASP-DAC 2000. Asia and South Pacific, pp. 265-270. IEEE, 2000.

Wei et al; "GLARE: global and local wiring aware routability evaluation," In Design Automation Conference (DAC), 2012 49th ACM/EDAC/IEEE, pp. 768-773. IEEE, 2012.

* cited by examiner

RESOURCE AWARE METHOD FOR OPTIMIZING WIRES FOR SLEW, SLACK, OR NOISE

BACKGROUND

The present invention relates to an improved method and apparatus for routing of nets in an integrated circuit and related functions such as determining the available capacity for re-routing of the net.

Circuit designers currently can use a variety of software tools to design electronic circuits that accomplish an intended task. For example, a digital circuit can be designed to accept digital inputs, perform some computation, and produce a digital output. An analog circuit may be designed to accept analog signals, manipulate the analog signals, such as amplifying, filtering, or mixing the signals, and produce an analog or digital output. Generally, any type of circuit can be designed as an integrated circuit (IC). Integrated circuits are electronic circuits formed using silicon as a substrate with added impurities to form solid-state electronic devices, such as transistors, diodes, and resistors. Commonly known as a "chip", an integrated circuit is generally encased in hard plastic. The components in modern day electronics generally appear to be rectangular black plastic pellets with connector pins protruding from the plastic encasement.

Modern High Performance microprocessors and very large ASIC designs require significant amounts of wiring resources. These resources are made available to design and manufacture a large set of wiring layers that can be as high as nineteen layers. These layers are arranged such that lower level layers are thinner but more abundant, providing more tracks to route signals. As the stack goes up, the layers become thicker and, therefore, less tracks become available for routing. Thinner lower level layers are more resistive and not as suitable for long high performance connections, although they can be suitable for gates connected within short distances. As the layers become thicker, resistance is reduced, rendering the layers, or planes, more attractive for connecting gates at faster speeds.

Furthermore, a multiple layer stack creates a 3D environment wherein signal wires are next to each other and, therefore, subject to potential interference from neighboring wires. This effect is known as signal coupling and can have the adverse effect of increasing delay propagation as well as inducing false signal transitions or glitches on gates.

SUMMARY

One aspect of the invention is directed to a method for determining whether or not wiring resources are available in a neighborhood of a physically routed net in all three dimensions, the method comprising controlling the size of the neighborhood by a region dynamically drawn around the routed path of the net.

Another aspect of the invention is directed to a method for determining whether or not wiring resources are available in a neighborhood of a physically routed net in all three dimensions, the method comprising controlling a size of the neighborhood by a region dynamically drawn around a routed path of the net, the method further comprising, based on determining that the routed net can be re-routed using a new wire trait instead of a previous wire trait associated with the routed net, assigning the new wire trait to the net, removing existing wires from the net, and re-routing the net with the new wire trait; and, based on determining that slack and/or noise adjust on the re-routed net are improved, keeping the re-routed net with the new wire trait or, based on determining that the slack and/or noise adjust on the re-routed net are not improved, restoring the previous wire trait and routing of the net.

Another aspect of the invention is directed to a method of re-routing a net using new wiring resources, the method comprising adjusting wiring utilization for a new wire trait, with respect to each net segment in the net, by subtracting a resource used by a current wire and adding a new resource used by a potential new wire; determining cumulative lengths of net segments that have capacity and dividing cumulative lengths by total length of the net to obtain a percentage of the net with capacity to be routed with the new wire trait; determining a measure of the percentage of the net with capacity to be routed with a new wire trait; and re-routing the net using the new wire trait, improved RC properties and reduced signal coupling are obtained.

Yet another aspect of the method comprises providing a set of wire traits for a net that is routed and is associated with a previous wire trait; selecting a new wire trait, from the set of wired traits, for the net; determining whether or not the net can be re-routed using the new wire trait and, if in the affirmative, assigning the new wire trait to the net, removing existing wires from the net, and re-routing the net with the new wire trait; and determining whether or not slack and/or noise adjust are improved and, if in the affirmative, keeping the re-routed net with the new wire trait, wherein determining whether or not the net can be routed using the new wire trait comprises adjusting wiring utilization, with respect to each net segment in the net, by subtracting resources used by a current wire and adding resources used by a potential new wire.

Yet another aspect is directed a method of rerouting a net using new wiring resources after determining that new wiring resources are available, wherein the new wiring resources provide improved RC properties and reduced signal coupling, the method comprising adjusting wiring utilization with respect to each net segment in the net, by subtracting resources used by a current wire and adding resources used by a potential new wire trait; determining cumulative lengths of net segments that have capacity and dividing cumulative lengths by total length of the net to obtain a measure of percentage of the net with capacity to be re-routed with a new wire trait; and determining whether or not a threshold is reached with respect to a the measure of the percentage of the net with capacity using the new wire trait and, if in the affirmative, re-routing using the new wire trait to re-route the net.

DETAILED DESCRIPTION

In view of the deficiencies of the prior art in this regard, Applicants disclose improved methods for improving the routing of wires for slew, slack, and/or noise, specifically in a sign-off environment for a microprocessor design. These methods can be embodied in software tools for designing IC's.

Such software tools can produce, manipulate, or otherwise work with a circuit layout at very small scales. Some of the components that such tools can manipulate may only measure tens of nanometer across when formed in silicon. Designs produced and manipulated using such software tools can be complex, often including billions of such components interconnected to form an intended electronic circuit. The logical connection between a group of two or more components is called a net. Software tools cam manipulate these components at the components level, or at the level of blocks of components, i.e. block level. A block of components is also known as a cell. An IC design software tool can, among other functions, manipulate cells, or interconnect components of one cell with components of other cells, so as to form nets. The physical interconnects between components are called wires. A wire is a connection between parts of electronic components, and is formed using a metallic material that conducts electricity.

One aspect of IC design is referred to as the placement problem, i.e. the problem of placing the cells of a chip such that the design meets all the design parameters of the chip. Routing is the process of connecting the pins after placement. In other words, placement results in a rendering of the components of various cells as being located in certain positions in the design, whereas routing results in a rendering of how the metal layers are used to connect pins on a net. A wire can be designed to take any one of the several available layer paths in a design. Placement of a wire on a certain layer path, or track, is a part of routing.

A layer is typically designated to accommodate wires of a certain width, (wire code). Generally, the wider the wire width of a layer, and the thicker the wire height of a layer, the faster the signal propagation speed for the net routed on that layer. Faster layers, to wit, layers with larger wire widths or higher wire height, can accommodate fewer components or nets as compared to slower layers with narrower wire widths.

A router is a component of an IC design tool that performs the routing function. Once the placement component, known as a "placer," has performed the placement function, the router attempts to connect the wires without causing congestion. For example, if a design parameter calls for no more than five wires in a given area, the router attempts to honor that restriction in configuring the wiring. Such limitations on the wiring are a type of design constraints and are called congestion constraints. Other types of design constraints may include, for example, blocked areas, i.e., cell areas where wires cannot be routed.

Routing is a multi-task activity composed at least, but not limited to, at least two operations a global routing phase and a detailed routing phase. The global routing task comprises dividing a routing region into small tiles, also known as g-cells, and route nets, or parts thereof, through the tiles such that no tile overflows its capacity. Imposing such a grid on an IC design abstracts the global routing problem away from the actual wire implementation and gives a more mathematical representation of the task. A net may span one or more cells and may cross several cut lines. After global routing, wires can be assigned to actual tracks within each tile. The detailed routing phase uses the global route results and track assignment to finalize the connections between components for each net.

In some embodiments of the invention, input to the optimization flow can be a design that has been placed and routed. Thus, the method flow is used to correct noise and slack violations in the design using the disclosed wire optimization method can be used to correct violations very late in the design cycle. Specifically, the design can be evaluated in order to determine the effects of crosstalk noise on the nets to be optimized.

The process can run in a session with an incremental timing engine, such as EinsTimer® and with an incremental noise engine, such as EinsSI® or EinsNoise® software or similar products. Alternative incremental noise engines may also be used. Thus, the present method for optimizing wires for slew, slack, and/or noise can be based on incremental determinations.

Slew can be defined as the maximum rate of change of output voltage per unit time. Slack can be defined as the difference between required arrival time of a signal and its actual arrival time. Signals propagating through a net lasts a certain amount of time, also known as delay. The amount of delay is determined by performing analysis on an RC (Resistance and Capacitance) network representation of a net. Noise refers to, but is not limited by, the delay contribution of nets with wires physically adjacent to the wires of a net being analyzed for delay. The present method can optimize at least noise, specifically both of noise and slack or noise and slew, most specifically the present method can optimize for slew, slack, and noise.

In the present method, a list of nets, which is determined to fail either slack or noise requirements, can be provided as input to the process, specifically as input to the main optimization flow of the method. As a preliminary matter, this list of nets can be first examined so that nets with certain characteristics can be filtered out and not be considered for optimization, specifically any net lacking a source or sink, any net which is already meeting slack and noise adjust requirements should be filtered out. A net must be routed without opens and/or shorts. Otherwise the noise impact cannot be determined.

As further input to an embodiment of the present method, a list of technology specific wire traits ordered by layer and RC properties is provided as input to the optimization flow for a single net.

A wiring trait can be defined as set of keywords associated with each net in the design which provide specifications to an automatic wiring tool regarding the metal layers on which the net can be routed, the thickness of the route, and minimum spacing requirements for that net to adjacent nets or other objects on the same layer.

A wiring trait (also sometimes referred to as "wire code") can have three components. A first component is a keyword that defines the range of layers on which a net can be routed. Generally, a wiring tool will try routing on the lowest metal layer in this range and the metal layer directly above that. This approach gives the net both a horizontal and vertical metal layer on which to route. If an area is congested, the automatic routing tool can choose layers higher than these first two metals, or it can even "cheat" and route on layers not within the range specified. However, in most cases, where there is adequate room, an automatic routing tool can find a solution within the specified layer range.

A second component of a wiring trait is a keyword known as the wire code. It specifies the thickness of the route, the spacing constraints between the net and adjacent nets and shapes, and the layer stack to which the constraints are applied. For example, a wire code can specify that a net is to be routed either using a minimum width, 2× the minimum width, 3× the minimum width, and so on. The wire code also defines if the net is to be routed such that there is minimum spacing to an adjacent net or shape, 2× the minimum spacing, 3× the minimum spacing, and so on.

A third component relates to the fact that nets are the logic connections between devices. In the physical domain, the output pins of the devices are usually in the lowest metal layer. Therefore a physical path is needed to connect a device output to the routing layers and back into the input of other devices. The physical path is known as a via stack and the wire code can specify the width of the metal layers as well as the size of the vias.

As mentioned above, embodiments on the method disclosed herein comprise selecting a wire trait candidate from input list of wire traits. In particular, the user can provide a list of all available wire traits, or a subset of all available wire traits as input to the tool. Each wire trait has an associated resistance per unit length and capacitance per unit length as defined for the technology. The RC delay per unit length can be calculated from these values. The list of wire traits given to the tool is sorted first by layer, from lowest metal layer to highest metal layer. Then within each layer, the traits are sorted by RC delay, from slowest to fastest.

A list of wire traits used in optimization of routing for a given technology metal stack can be generated, as well be appreciated by the skilled artisan. For a given technology, a verbose full layer trait, ranging from coarser to finer, can be obtained by exploring all layers of the metal stack and all possible wire codes for the technology stack. Optionally, such an initial verbose full layer trait list can be pruned according to timing and congestion costs.

In accordance with the method disclosed herein, when a net is passed to the tool to be optimized, its RC per unit length can be compared to the sorted list of wire traits. The first trait in the sorted list which is on the same layer or higher and with a smaller RC (faster) is selected as a potential candidate for the new wiring trait for routing.

An embodiment of the method will now be described with respect to three inter-related optimization flow charts in FIGS. 1, 2, and 3. The flowcharts or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

It will be understood that each block of each flowchart or block diagrams, and combinations of blocks in the flowchart and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 1:
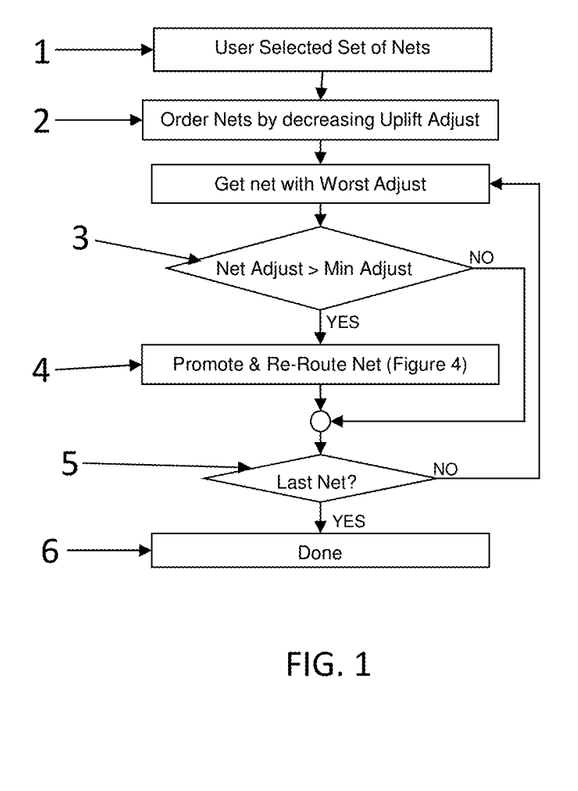
FIG. 1 is a first flow chart illustrating an embodiment of the main optimization flow of a method of optimizing wires for slew, slack, and noise, in accordance with the invention.

Accordingly, FIG. 1 is a first flow chart illustrating an embodiment of the main optimization flow for a method of optimizing wires for slew, slack, and/or noise. The main optimization flow of FIG. 1 is designed to use wire optimization to fix noise impact on timing. Noise manifests itself in terms of additional delay and slew added to the net delay and net sinks slew if a net is coupled. The additional delay compounded across multiple coupled nets within a path can result in the slack in the path being negative, thereby leading to a design fail. It is, therefore, important to eliminate or reduce coupling impact to the point where the slack on each net in the path becomes positive.

Referring to FIG. 1, the main optimization flow comprises a block 1 for providing, as input, a selected set or list of nets which is determined to fail either slack or noise requirements. At block 2, the nets can then be ordered by decreasing uplift adjust. By uplift adjust is meant the delay contribution to the total delay of a net due to the nets with wires physically adjacent to the wires of the analyzed net. At block 3, the net with the worst adjust is compared to the minimum adjust, which is a user selected minimum tolerable delay. In most cases and without loss of generality it is set to zero. If the net adjust is greater than the minimum adjust, then the net can be promoted block 4, where the net is re-routed according to the optimization flow depicted in FIG. 2, to be described. If the net adjust is not greater than the minimum adjust and if the net is not the last net in the set of nets, as determined at block 5, then next net with the worst adjust is obtained and the previous steps are repeated. Once the last net is promoted and re-routed, the main optimization flow can be considered finished, as indicate at block 6.

Figure 3:
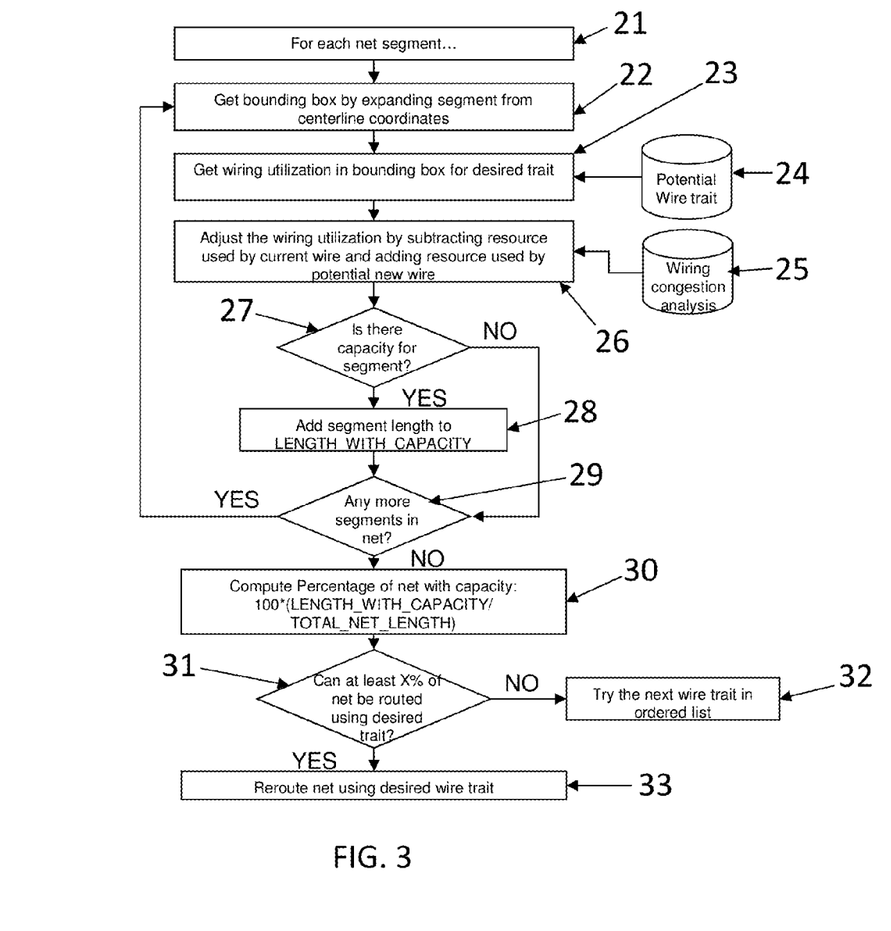
FIG. 3 is a third optimization flow chart for a method of determining resource availability using a desired new wire trait, which third optimization flow chart is referenced in the second optimization flow chart of FIG. 2, according to an embodiment.

Once the first wire trait candidate is selected, a process can be used to determine whether there is capacity to route the net to be optimized using the new (desired) wire trait, as illustrated in FIG. 3 and described below. This capacity analysis can accurately determine if there are wiring resources available along the route of the net, before the net is re-routed. This approach can ensure a very high degree of re-routing success while fixing the noise impact or improving the slack on the net to the point where coupling will not cause a circuit failure.

Figure 2:
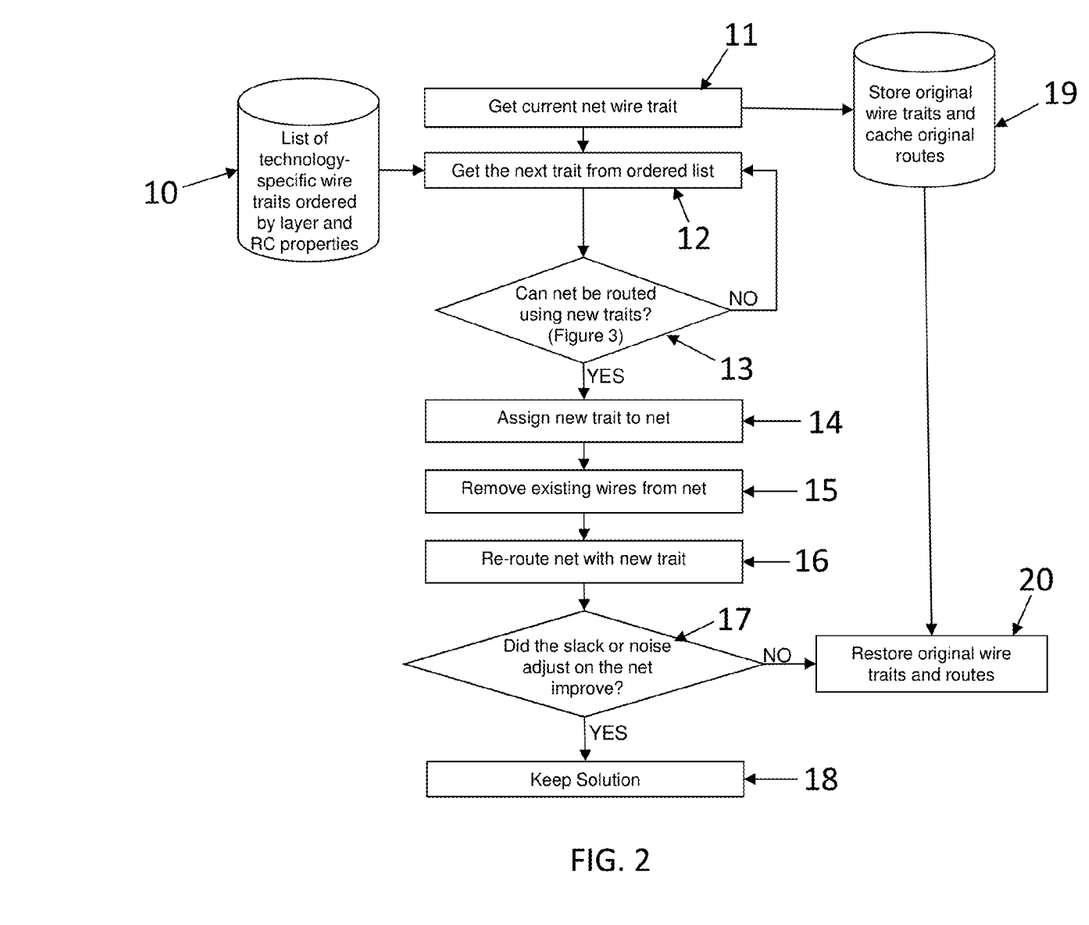
FIG. 2 is a second flow chart illustrating an embodiment of the optimization flow for a single net, which second flow chart is referenced in the first (main) optimization flow chart of FIG. 1, according to an embodiment of the invention.

Referring to FIG. 2, an optimization flow for a single net is illustrated. In particular, as mentioned above, a list or set of wire traits is provided at block as input to the optimization flow, in addition to the wire trait of the current net wire trait at block 11, which is stored and cached with other original traits and original routes at block 19, for use (based on later determinations at block 17) in restoring original wire traits and routes at block 20. In particular, the optimization flow of FIG. 2 comprises, at block 12, selecting next wire trait using input from block 10 mention above, which input comprises the ordered list of the wire traits based on layer and RC properties. At block 13, a determination can then be made as to whether the net can be routed using the selected (new) wire trait. This determination is described in reference to the optimization flow chart of FIG. 3. If the answer is no, the optimization flow returns to block 12 and the next trait is obtained from the ordered list and the optimization flow continued as before If the net can be routed using the new wire trait, then at block 14 the new trait is assigned to the net, at block 15 the existing wires are removed from the net, and at block 16 the net is re-routed with the new wire trait. At block 17, a determination can then be made as to whether the slack or noise adjust on net improved. If it did improve, then the re-routing solution can be kept, as indicated at block 18. If the net did not improve, as determined at block 17, then at block 20, as mentioned above, the original wire trait and route can be restored.

FIG. 3 illustrates an embodiment of the method of determining resource availability using the (potentially desired) new wire trait obtained from the optimization flow of FIG. 2 just described. The optimization of FIG. 3 comprises, starting at block 21 for each net segment of the net being evaluated in block 13 in the optimization flow of FIG. 2, at block 22 drawing a bounding box around each net segment.

Figure 4:
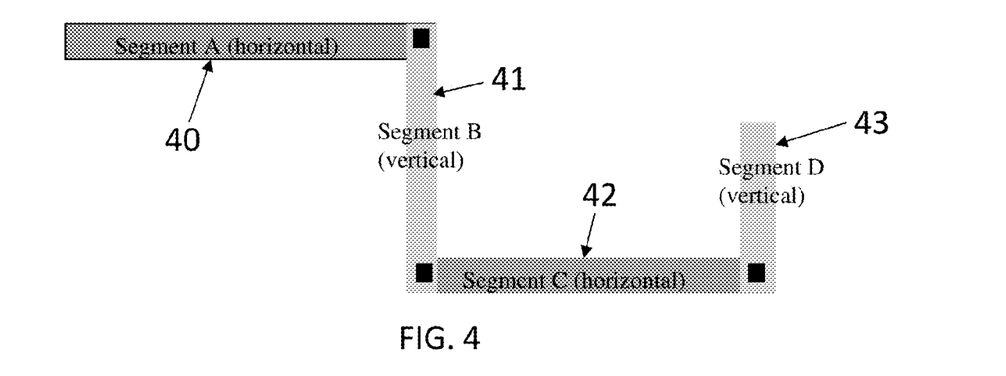
FIG. 4 depicts an example of a net comprising four segments, in reference to determinations employed in the third optimization flow chart of FIG. 3, according to an embodiment.
Figure 5A:
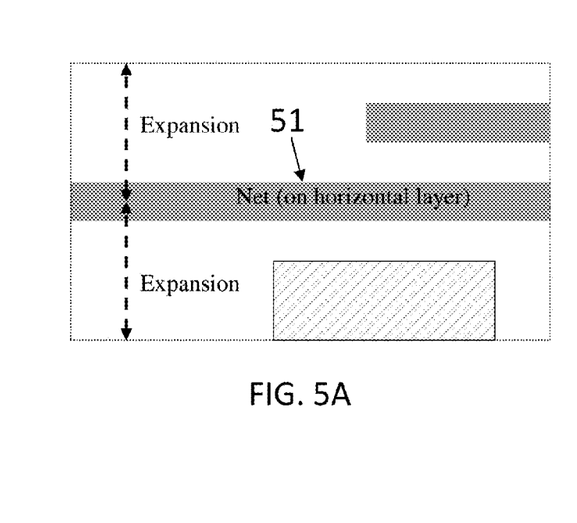
FIG. 5A depicts an example of a bounding box around a horizontal net segment, in reference to determinations employed in the third optimization flow chart of FIG. 3, according to an embodiment.
Figure 5B:
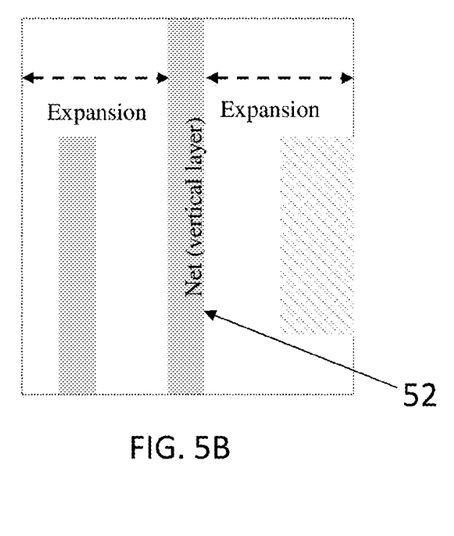
FIG. 5B depicts a bounding box around a vertical net segment, in reference to determinations employed in the third optimization flow chart of FIG. 3, according to an embodiment.

A net is comprised of multiple "segments," as illustrated in FIG. 4, showing net segments 40, 41, 42, and 43. A segment is defined as a portion of the wire that runs in a straight line horizontally or vertically. For each and every segment, the present method determines which layer the net is on and in which direction the layer runs. The bounding box can be created around the segment by expanding the segment by a given amount on each side perpendicular to the direction of the layer, as illustrated in FIGS. 5 (*a*) and (*b*), which diagrammatically depicts (a) expansion of the net 51 on a horizontal layer and (b) expansion of a net 52 on a vertical layer. The amount of expansion used in this process is a multiple (1× or 2×, for example) of power grid pitch. Any small segment (for example, specified to be less than 10 micrometers) can be judged not useful for the calculation and ignored.

Figure 6:
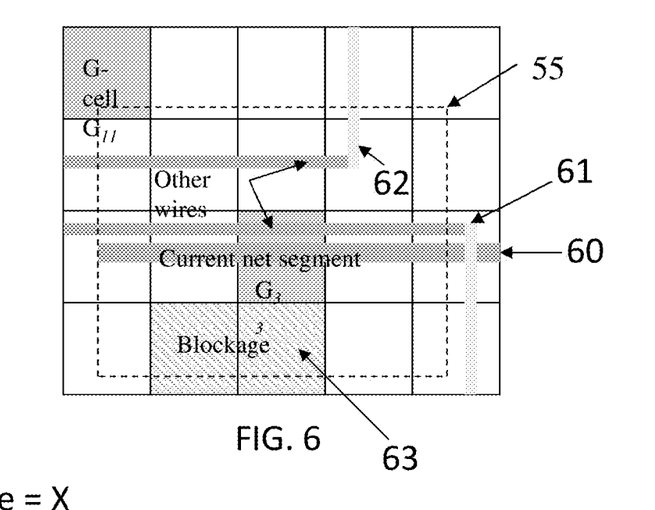
FIG. 6 depicts an example of a calculation of wiring capacity for a given region, in reference to determinations employed in the third optimization flow chart of FIG. 3, according to an embodiment.

At block 23 wiring utilization is obtained in the bounding box (from block 22) for the potential new wire trait received as input from block 24. According to the embodiment of FIG. 3, at block 25, analysis of wiring congestion in a region can be accomplished as follows. Once the bounding box around the segment is drawn at block 55, as depicted in FIG. 6 for a current net segment 60 in relation to other wires 61 and 62, the horizontal (vertical) layer usage in the region can be determined as well as the total horizontal (vertical) layer capacity. These values can be calculated based on design wiring information obtained from a wiring congestion analysis step executed previously and provided as an input to the proposed approach.

Wiring congestion analysis can divide the design into smaller tiles, known as G-cells, as illustrated in FIG. 6. Each G-cell contains the wiring and capacity information used within the G-cell. For example, a G-cell over a blockage 63 has zero capacity, and it is fully occupied. On the other hand, a G-cell that does not overlap any blockage can have 100% capacity and usage determined by the number of tracks crossing the G-cell. If, for example, the capacity of a G-cell is five tracks, then the G-cell ($G_{33}$ *in* FIG. 6) overlapping the net segment 60 can return 100% capacity and 40% usage. If a G-cell is partially blocked then the capacity number can reflect that information.

A net segment bounding box is usually substantially bigger than a G-cell as shown in FIG. 6. This assumption is reasonable because significant capacitive coupling requires nets adjacent to each other for distances that are several times the size of a typical G-cell. Therefore the capacity and wiring usage within the bounding box is calculated by adding the respective values of usage and capacity of each internal or partially overlapping G-cell. The average utilization for all the G-cells overlapping the bounding box is obtained by dividing the cumulative Total Usage over all the G-cells by the cumulative Total Capacity.

In the optimization flow of FIG. 3, after employing a bounding box, wiring utilization in the bounding box is obtained at block 23 for a desired new trait. At block 26, the wiring utilization is adjusted by subtracting resource used by the current wire and adding the resource used by the potential new wire trait, based on the wiring congestion analysis at block 25, described with respect to FIGS. 6 and 7.

Figure 7:
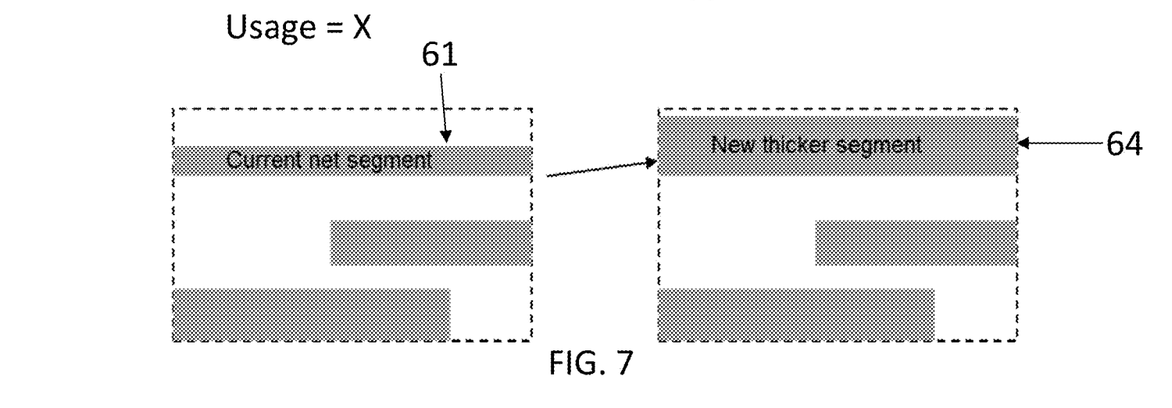
FIG. 7 depicts an example of auto-adjustment, in reference to determinations employed in the third optimization flow chart of FIG. 3, according to an embodiment.

The present method can further comprise auto adjustment, as depicted in FIG. 7. In particular, for even greater accuracy, the expected Total Usage number for a net routed with the new wiring resource can be estimated and used to determine if the new wire trait is a suitable candidate for the available resources.

This auto adjustment can be accomplished for two reasons. First, the wiring analysis engine is incremental. After a net is routed, any queries with respect to G-cell usage and capacity reflect the newly routed data. Second, in the disclosed method a net is routed immediately after the successful determination of new wiring resources. Based on a determination that there are wiring resources, the probability that the newly routed net can use such resources is very high. As such and to increase the accuracy, the disclosed method can predict what the usage would be if the net is re-routed with the new resource and can use it to determine if the new wire trait is a suitable candidate. The new estimated usage is determined by subtracting, from the current usage "X," the contribution of the existing wire segment 61 (or current wire segment area) and adding the contribution of the new wire trait (new segment area) to obtain new thicker wire segment 64, as illustrated in FIG. 7. This analysis can be performed across all G-cells within the region. If the new usage is still below a user specified percentage, the new wire trait is selected as a candidate; otherwise a new candidate is chosen.

Thus, to determine whether a net can be routed using a desired new wire trait, the analysis can first determine the congestion for each net segment bounding box on the wiring layer specified by the desired new wire trait. It will choose either the horizontal or vertical layer to analyze by looking at the direction of the net segment. A user can provide a threshold for which the tool is to decide that the bounding box is congested. For example, a user can set this threshold to 80%. This means that if the total usage within the bounding box is already at 80% or above, there is no capacity within the bounding box to route a net through it using the desired new wire trait. The threshold value can be selected by trial and error. A more conservative threshold, such as 70%, has shown to provide greater chance for an automatic router to be able to route the net using the desired new wire trait without cheating or jogging of wires.

Referring again to FIG. 3, capacity for the net segment is then determined with respect to the new wiring trait at block 27. If the determination is in the affirmative, then at block 28, the net segments that are determined to have capacity to be routed using desired new wire traits can have their lengths added together. If there are any more net segments in the net, as determined at block 29, then each additional wire segment of the net can be analyzed as previously described, by returning to block 22. If not, the optimization flow can proceed to block 30, wherein net segments that have been determined to have capacity to be re-routed using the desired new wire traits can have their lengths added together. This number can be divided by the total length of the net to obtain the percentage of the net with capacity to be re-routed with the new trait. At block 31, a determination can be made as to whether or not this percentage is greater than a desired amount, wherein a user selected is indicated as "X %") in block 31. If in the negative, then the next new wire trait can be selected from the ordered list at block 32, referring to blocks 10 and 12 in FIG. 2, before the net is re-routed. On the other hand, if at block 31 the determination is in the affirmative, then at block 33 the net can be re-routed using the new (desired) wire trait.

In some embodiments, determining whether capacity exists within a bounding box can require a threshold in a range of 40 to 80 percent. For example, if 60% is the user selected value for the net threshold, then if 60% of the net path has capacity to be routed with the new wire trait, then the entire net will be tagged using the new wire trait and passed to the automatic router. If it is determined that less than 60% of the net path (or desired net threshold) has capacity to be routed on the desired wire trait, then the flow can select the next wire trait in the list and the analysis process repeated. If all of the traits in the list are tried and the capacity analysis for each one is below the desired percentage it can mean that the design is densely wired in the region where the net is routed and a new net can be selected.

The previously described method can involve the evaluation of two numbers. The first is the percentage usage applied to each wire segment. The second is the percentage usage applied to the whole net path composed of the sum of all segments. Although 80% and 60% were numbers mentioned in this description, these are parameters to the flow that the user would be able to control. Segment percentage can be greater or equal to the net percentage for obtaining increased chance of finding a viable wire trait.

It is possible, many times, to have a net segment with very high usage percentage while the net usage is below the target usage. This can means that the net is being routed on a sparsely populated wiring region, while the net segment is routed in a region with high wiring congestion. One potential alternative to the described method would be to increase the bounding box around that segment to see if the usage percentage is reduced indicating how localized the congestion is. If the new usage falls with the limits then the new wire trait can be selected.

According to the present method, if a net is determined to have capacity using a given wire trait, as determined in the optimization flow of FIG. 3, then the net can be assigned the new wire trait and the existing routes are discarded, as illustrated in FIG. 2. The net can then be re-routed. The route can be performed with different strategies, such as a point to point detail route or using a more complete solution where global routes are first created to guide the detailed routing part. Either has value and they can be evaluated on a case by case basis.

After the net has been routed using the new wire traits, the slack can be queried at the source pin of the net. This action can trigger an incremental timing engine (for example, EinsTimer® or its equivalent software) and an incremental noise engine (For example, EinsSI/EinsNoise® or its equivalent software) in order to update the delay on all the affected nets by the re-routing of the net. Other suitable incremental engines, as they are developed, can be used in association with the disclosed embodiments.

Specifically, if such incremental engines determine that slack can be improved or noise delay adjust was reduced without degrading the slack, the new wire trait and routes can be kept. If the new solution caused slack degradation or did not reduce the noise delay, then the new wire trait and new routes can be discarded and the original wires restored and associated to the net.

Referring back to FIG. 1 again, after a net is processed as described above, a new net can be picked from the list of nets with critical noise adjust and the optimization flow as indicated above repeated. Analysis of metal layer usage for the new net can already take into account any new routes as the congestion analysis incrementally updates usage and capacity information to reflect new routes. Also, due to the incremental features of EinsTimer® and EinsSI (EinsNoise®) engines, the optimization of one net can cause a downstream net to see improvement in slack, due to the effects of slack propagation. Also, a net which is a neighbor to the optimized net may see an improvement in slack and/or delay adjust due to reduced coupling effects between the nets. Thus, as the engine or tool goes through the list of nets it was given to optimize in the main optimization flow of FIG. 1, it will check and find that some are no longer failing, and such nets can be skipped.

An alternative embodiment of the above-described method can be to analyze all the nets at once to determine all the new wire traits. Afterwards, the new wire traits can be applied to all the nets and the set of nets re-routed as a group. This alternate embodiment does not have the undo mechanism previously described but can reduces the run-time significantly at the cost of losing the incremental updates to wire information and timing.

In view of the above, embodiments are disclosed for a method to determine if wiring resources are available in the neighborhood of a physically routed net in all three dimensions. The size of the neighborhood is controlled by a region dynamically drawn around the routed path of a net.

In view of the above, embodiments of the present method include methods to select a wire trait based on the percentage usage of each wire segment in a net and the total percentage usage of the net, calculated as the sum of the usages of each net segment divided by the total length of the routed path of the net.

The present methods can be used to re-route a net using new wiring resources after determining that the wiring resources are available. The new resources have better RC (delay) characteristics and reduced signal coupling. The percentage of resource increase within the routed path of a net can be calculated to guarantee that the new resource can successfully be used. Embodiments of the method can employ an incremental uplift analysis engine to determine noise impact on timing and incrementally fix coupling reported on wires within an in-core system.

Embodiments of the present method can be applied to VLSI design with multiple fails, as can be appreciated by the skilled artisan. As will be appreciated by one skilled in the art, aspects of the present invention may be embodied as a system, method, or computer program product. Accordingly, aspects of the present invention can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention can take the form of a computer program product embodied in any one or more computer readable medium(s) having computer usable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium can include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions can also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for determining whether or not wiring resources are available in a neighborhood of a physically routed net in all three dimensions, the method comprising controlling a size of the neighborhood by a region dynamically drawn around a routed path of the physically routed net, the method further comprising:
    generating at least one physically routed net of an initial integrated circuit;
    based on determining that the at least one physically routed net can be re-routed using a new wire trait instead of a previous wire trait associated with the at least one physically routed net, assigning the new wire trait to the at least one physically routed net, removing existing wires from the at least one physically routed net, and re-routing net segments with the new wire trait;
    based on determining that a slack and/or noise adjust on the re-routed net are improved, keeping the re-routed net with the new wire trait or, based on determining that the slack and/or noise adjust on the re-routed net are not improved, restoring the previous wire trait and routing of the at least one physically routed net;
    selecting a new wire trait for the at least one physically routed net based on a percentage usage of each net segment in the at least one physically routed net and total percentage usage of the at least one physically routed net, calculated as a sum of usages of each net segment subjected to a wiring congestion analysis divided by total length of the at least one physically routed net's routed path; and
    determining wiring usage and capacity within a bounding box by adding respective values for usage and capacity of each internal or partially overlapping-G-cell used to divide wiring design;
    wherein the new wire trait is selected from a keyword defining a range of layers on which the at least one physically routed net can be routed; a wire code keyword specifying thickness of the route, spacing constraints, and a layer stack to which the constraints are applied; and logical connections between devices; and
    automatically routing at least one wire, via an automatic router device, to form at least one optimized net based on the selected trait,
    wherein the at least one optimized net is used to manufacture a wiring layer included in an Application-Specific Integrated Circuit (ASIC).

2. The computer-implemented method of claim 1, further comprising adjusting wiring utilization, with respect to each net segment in the at least one physically routed net, by subtracting resource used by a routed wire and adding resource used by a potential new wire.

3. The computer-implemented method of claim 2, further comprising determining a measure of a percentage of the at least one physically routed net having capacity to be re-routed with the new wire trait.

4. The computer-implemented method of claim 3, further comprising determining and adding together lengths of net segments, within the at least one physically routed net, having capacity and dividing by a total length of the at least one physically routed net to obtain a measure of a percentage of the at least one physically routed net with capacity to be re-routed with the new wire trait.

5. The computer-implemented method of claim 1, wherein determining whether capacity exists within a bounding box requires a threshold pre-selected by a circuit designer.

6. The computer-implemented method of claim 1, further comprising determining a measure of percentage of resource increase within the re-routed path of a net to guarantee that the new resource can successfully be used and wherein the obtaining is performed by determining cumulative lengths of net segments that have capacity and dividing cumulative lengths by total length of the physically routed net.

7. The method of claim 6, wherein the method comprises employing an incremental uplift analysis engine to determine a noise impact on timing and to incrementally fix coupling reported on wires within an in-core system.

8. The method of claim 7, further comprising application to a VLSI design with multiple fails.

9. A method of re-routing a net using new wiring resources, the method comprising:
 generating a physically routed net of an initial integrated circuit;
 adjusting wiring utilization for a new wire trait, with respect to each net segment in the physically routed net, by subtracting a resource used by a current wire and adding a new resource used by a potential new wire;
 obtaining a percentage of the physically routed net with capacity to be routed with the new wire trait;
 determining a measure of percentage of the physically routed net with capacity to be routed with the new wire trait; and
 re-routing the physically routed net using the new wire trait; wherein
 the new wire trait is selected based on a measure of percentage usage of each wire segment in the physically routed net and a measure of total percentage usage of the physically routed net calculated as a sum of usages of each of the net segments divided by total length of a routed path of the physically routed net;
 determining wiring usage and capacity within a bounding box by adding respective values for usage and capacity of each internal or partially overlapping-G-cell used to divide wiring design;
 wherein re-routing the physically routed net includes automatically routing at least one wire, via an automatic router device, to form at least one optimized net based on the selected new wire trait, and
 wherein the new wire trait is selected from a keyword defining a range of layers on which the net segments can be routed; a wire code keyword specifying thickness of the route, spacing constraints, and a layer stack to which the constraints are applied; and logical connections between devices,
 wherein the at least one optimized net is used to manufacture a wiring layer included in an Application-Specific Integrated Circuit (ASIC).

10. The method of claim 9, further comprising determining a measure of percentage of resource increase within a re-routed path of the physically routed net to guarantee that the new resource can successfully be used, wherein improved RC properties and reduced signal coupling are obtained by the re-routing.

11. The method of claim 10, comprising:
 providing a set of wire traits for a net that is routed and associated with a previous wire trait;
 selecting a new wire trait from the set of wire traits;
 based on determining that the physically routed net can be re-routed using the new wire trait, assigning the new wire trait to the physically routed net, removing existing wires from the physically routed net, and re-routing the physically routed net with the new wire trait;
 based on determining that a slack and/or noise adjust are improved, keeping the re-routed net with the new wire trait;
 wherein determining that the physically routed net can be routed using the new wire trait comprises adjusting wiring utilization, with respect to each net segment in the physically routed net, by subtracting resources used by a current wire and adding resources used by a potential new wire.

12. The method of claim 11, wherein the method comprises restoring the previous wire trait and route if a negative determination is made in determining whether or not slack and/or noise adjust are improved and wherein the obtaining is performed by determining cumulative lengths of net segments that have capacity and dividing cumulative lengths by total length of the physically routed net.

13. The method of claim 11, wherein lengths of the net segments in the physically routed net that are determined to have capacity are added together and divided by total length of the physically routed net to obtain a measure of percentage of the physically routed net with capacity to be re-routed with the new trait.

14. The method of claim 11, wherein re-routing of the physically routed net using the new wire trait provides improved RC and delay properties and reduced signal coupling.

15. A computer program product for determining whether or not wiring resources are available in a neighborhood of a physically routed net in all three dimensions, comprising a computer-readable storage medium having program code embodied thereon, wherein the computer readable storage medium is not a transitory signal per se, which when executed by a computer processor, causes the computer processor to implement a method, the method comprising:
 controlling a size of the neighborhood by a region dynamically drawn around a routed path of at least one physically routed net;
 based on determining that the at least one physically routed net can be re-routed using a new wire trait instead of a previous wire trait associated with the at least one physically routed net, assigning the new wire trait to the at least one physically routed net, removing existing wires from the at least one physically routed net, and re-routing the at least one physically routed net with the new wire trait;
 based on determining that a slack and/or noise adjust on the re-routed net are improved, keeping the re-routed net with the new wire trait or, based on determining that the slack and/or noise adjust on the re-routed net are not improved, restoring the previous wire trait and routing of the at least one physically routed net;
 selecting a new wire trait for the at least one physically routed net based on a percentage usage of each net segment in the at least one physically routed net and total percentage usage of the at least one physically routed net, calculated as a sum of usages of each net segment subjected to a wiring congestion analysis divided by total length of the net's routed path; and determining wiring usage and capacity within a bounding box by adding respective values for usage and capacity of each internal or partially overlapping-G-cell used to divide wiring design;

wherein the new wire trait is selected from a keyword defining a range of layers on which the at least one physically routed net can be routed; a wire code keyword specifying thickness of the route, spacing constraints, and a layer stack to which the constraints are applied; and logical connections between devices and automatically routing at least one wire, via an automatic router device, to form at least one optimized net based on the selected trait, wherein the at least one optimized net is used to manufacture a wiring layer included in an Application-Specific Integrated Circuit (ASIC).

16. The computer program product of claim 15, wherein the method further comprises adjusting wiring utilization, with respect to each net segment in the at least one physically routed net, by subtracting resource used by a routed wire and adding resource used by a potential new wire.

17. The computer program product of claim 16, wherein the method further comprises determining a measure of a percentage of the at least one physically routed net having capacity to be re-routed with the new wire trait.

18. The computer program product method of claim 17, wherein the method further comprises determining and adding together lengths of net segments, within the at least one physically routed net, having capacity and dividing by a total length of the at least one physically routed net to obtain a measure of a percentage of the net segments with capacity to be re-routed with the new wire trait.

19. The computer program product of claim 15, wherein determining whether capacity exists within a bounding box requires a threshold pre-selected by a circuit designer.

* * * * *